United States Patent Office 3,468,805
Patented Sept. 23, 1969

3,468,805
DETERGENT COMPOSITION
Richard A. Grifo, Easton, Pa., and John M. Walts, Clark, and Leslie M. Schenck, Mountainside, N.J., assignors to GAF Corporation, New York, N.Y., a corporation of Delaware
No Drawing. Filed Oct. 22, 1965, Ser. No. 502,386
Int. Cl. C11d 1/46
U.S. Cl. 252—152              4 Claims

ABSTRACT OF THE DISCLOSURE

This document describes a biodegradable detergent composition containing a mixture of soluble sulfate half-esters of acyclic secondary alcohols and soluble sulfate half-esters of acyclic secondary alcohol alkylene oxide adducts.

---

This invention relates to a novel detergent composition which comprises a mixture of organic sulfate esters in water-soluble form. The novel detergents of this invention have improved foaming and detergent properties and foam stability, as well as biodegradability. They can be prepared from low-cost row materials.

It is known that many sulfate half-esters of organic materials have good detergency properties when the sulfate half-ester is converted to a water-soluble salt with a solubilizing cation such as alkali metal or ammonium. It is also known that when the organic radical is of the acyclic type it is more susceptible to digestion in sewage treatment plants by living microorganisms than are compounds containing cyclic organic radicals. Thus, the industry has been encouraged by those concerned with stream pollution to abandon cyclic materials such as alkyl benzene sulfonates, in favor of acyclic detergents such as sodium lauryl sulfate which are biodegradable.

These acyclic materials often use fatty acids of animal or vegetable origin as their starting material and are manufactured to sulfate form through conversion to the primary alcohol. It is apparent that olefin hydrocarbons from petroleum sources would constitute a much less expensive source of starting materials, but ordinarily these olefins are more readily converted to secondary rather than primary alcohols. Also, it is often desirable to impart an unsymmetrical hydrophilic-hydrophobic character to such olefins and alcohols and this is most readily accomplished by alkoxidation of the alcohol.

The soluble sulfate half-esters of long chain secondary alcohols are shown to be biodegradable in "Detergency and biodegradability of Alcohol-Based sec-Sulfates" by Livingston et al. in vol. 4, I & EC Product Research and Development, pages 28–32, March 1965.

It has now been found that a mixture of soluble sulfate half-esters of acyclic secondary alcohols with soluble sulfate half-esters of acyclic secondary alcohol alkylene oxide adducts has better detergency and foam stability properties than either sulfate alone. The instant invention comprises water-soluble admixtures of compounds of the following formulae:

R—O—SO₃—M

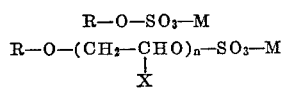

wherein R is a hydrocarbon radical containing at least 8 carbon atoms and derived from an acyclic secondary alcohol, X is selected from the group consisting of H and CH₃, M is a mono-valent water-solubilizing cation, and n is from about 1–10, preferably from about 2–5. The R group generally has no more than about 24 carbon atoms, preferably no more than 18 carbon atoms.

The acyclic, generally linear secondary alcohols from which the detergent components of this invention are made often have a random distribution of the hydroxyl function, and include 2-octanol, 3-octanol, 4-octanol, 2-nonanol, 3-nonanol, 4-nonanol, 5-nonanol, 2-decanol, 3-decanol, 4-deconal, 5-decanol, 2-undecanol, 3-undecanol, 4-undecanol, 5-undeconal, 6-undeconal, 2-dodecanol, 3-dodecanol, 4-dodecanol, 5-dodecanol, 6-dodecanol, 2-tridecanol, 3-tridecanol, 4-tridecanol, 5-tridecanol, 6-tridecanol, 7-tridecanol, 2-tetradecanol, 3-tetradecanol, 4-tetradecanol, 5-tetradecanol, 6-tetradecanol, 7-tetradecanol, 2-pentadecanol, 3-pentadecanol, 4-pentadecanol, 5-pentadecanol, 6-pentadecanol, 7-pentadecanol, 8-pentadecanol, 2-hexadecanol, 3-hexadecanol, 4-hexadecanol, 5-hexadecanol, 6-hexadecanol, 7-hexadecanol, 8-hexadecanol, and the like or admixtures of fractions of the above.

The linear secondary alcohol alkoxylate sulfates needed are preferably prepared from the two to five mole alkylene oxide adducts of the above alcohols, or admixture of alcohols. The ethylene oxide adducts are preferred. The alcohol or adduct can be sulfated and converted to the salt form by the method given in the aforementioned Livingston et al. article.

Secondary alcohols which are unreacted in the alkoxidation may be removed from the alkoxylate mixture by distillation prior to sulfation. However, an important advantage of this invention is that such a removal procedure need not be performed, but the entire mixture of alcohol and adduct may be sulfated together to produce the novel detergent composition of this invention. This advantage is of particular importance due to the fact that the secondary alcohols, which are of interest in biodegradable surfactants, do not ethoxylate nearly as readily as primary alcohols which have formerly been used, with the result that the ethoxylated product is apt to contain substantial amounts of unethoxylated secondary alcohols. It has been found, however, that by sulfating a mixture of ethoxylated secondary alcohol and unreacted secondary alcohol, a better dishwashing component is obtained than by sulfation of ethoxylated secondary alcohol which has been freed of unreacted secondary alcohol.

Although some benefits are derived using proportions as low as about 20 parts secondary alcohol ethoxylate sulfate to 80 parts secondary alcohol sulfate, higher ratios of about 60–95% secondary alcohol ethoxylate sulfate to 5–40 parts of secondary alcohol sulfate are preferred.

When employed for detergent purposes, relatively small amounts of the compositions of the invention are required to be dissolved in aqueous solution. Thus, a solution containing 0.05% of the active secondary alcohol—secondary alcohol alkoxylate sulfate mixture is sufficient to provide improved detergent and foam producing properties, although larger or smaller amounts may be employed where so desired.

The examples set forth in the tables hereinafter are illustrative of the instant invention and are not to be regarded as limitative. Detergent solutions were made up in water containing 0.05% (500 p.p.m.) of the detergent or detergent mixture listed for each sample. These solutions were then used in washing by hand dishes nine inches in diameter which had been coated with 3 grams each of a mixture made by melting 80 parts hydrogenated cottonseed oil shortening, and mixing with it 20 parts of white flour and 0.5 part of "Oildag," a colloidal dispersion of graphite in oil. The number of dishes washed before disappearance of the foam was considered the endpoint for the test. The secondary alcohol sulfates were prepared by the method given in the Livingston et al. article mentioned above.

Table I shows the improvement obtained when a very minor amount of secondary alcohol sulfate is used to replace some of an ethylene oxide (E.O.) adduct sulfate.

TABLE I.—SULFATE COMPOSITION

| Sample | Inorganic cation | Organic radical | Percent | No. of dishes washed |
|---|---|---|---|---|
| 7 | Na+ | 8 mole E.O. (adduct of hexadecanol-2). | 100 | 5 |
| 8 | {Na+ / Sample 7 | Decanol-4 | 5 / 95} | 11 |

In Table II the test results show that mixtures of ethylene oxide adduct and propylene oxide (P.O.) adduct sulfates with secondary alcohol sulfates give results superior to the use of either detergent alone.

TABLE II.—SULFATE COMPOSITION

| Sample | Inorganic cation | Organic radical | Percent | No. of dishes washed |
|---|---|---|---|---|
| 5 | NH4+ | 2 mole E.O. adduct of octanol-3. | 100 | 1 |
| 14 | NH4+ | 3 mole P.O. adduct of octanol-4. | 100 | 3 |
| 16 | Na+ | Tetradecanol-5 | 100 | 4 |
| 6 | {Sample 5 / Sample 16 | | 65 / 35} | 9 |
| 15 | {Sample 14 / Sample 16 | | 70 / 30} | 11 |

In Table III sample 9 shows the soluble sulfate half-esters of a mixture of secondary alcohols in the 8–18 carbon atom range to comprise a good dishwashing detergent. Sample 10 shows the 2 mole ethylene oxide adduct to be far better while sample 12 shows the less preferred 10 mole ethylene oxide adduct half-ester to be not quite as good. Samples 11 and 13, however, show mixtures of the ethoxylated and unethoxylated soluble sulfate half-esters of the same alcohol mixture to be greatly superior to either component used separately.

TABLE III.—SULFATE COMPOSITION

| Sample | Inorganic cation | Organic radical | Percent | No. of dishes washed |
|---|---|---|---|---|
| 9 | NH4+ | Octanol-4 / Sec-nonanols / Decanol-2 / Undecanol-5 / Sec-Dodecanols / Sec-treidecanols / Sec-tetradecanols / Sec.-pentadecanols / Sec.-hexadecanols / Octadecanol-5 | 1 / 3 / 4 / 4.8 / 14 / 17 / 15 / 30 / 10 / 1.2 | 7 |
| 10 | NH4+ | 2 mole E.O. adduct of alcohol mixture of sample 9. | 100 | 14 |
| 11 | | {Sample 9 / Sample 10 | 30 / 70} | 22 |
| 12 | Na+ | 10 mole E.O. adduct of alcohol mixture of sample 9. | 100 | 5 |
| 13 | | {Sample 9 / Sample 12 | 40 / 60} | 18 |

What is claimed is:

1. A water-soluble detergent composition suitable for dishwashing, consisting essentially of about 5–40% of a sulfate of the formula:

$$R-O-SO_3-M$$

and about 60–95% of a sulfate of the formula:

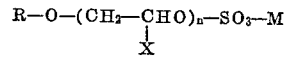

wherein R is a hydrocarbon radical containing 8 to 24 carbon atoms and is derived from a acyclic secondary alcohol, X is selected from the group consisting of H and $CH_3$, M is a monovalent water-solubilizing cation, and $n$ is an integer from about 1–10.

2. The composition of claim 1 wherein $n$ is an integer of about 2–5.

3. The composition of claim 2 wherein X is H.

4. The composition of claim 3 wherein R contains from about 8 to 18 carbon atoms and M is selected from the group consisting of alkali metal and ammonium cations.

References Cited

UNITED STATES PATENTS 2,088,020  7/1937  Wickert _____ 252—161
2,637,740  5/1953  Kosmin _____ 252—161 X

FOREIGN PATENTS 855,893  12/1960  Great Britain.

LEON D. ROSDOL, Primary Examiner

P. E. WILLIS, Assistant Examiner

U.S. Cl. X.R.

252—138, 137, 161